United States Patent [19]

Brooks et al.

[11] 3,886,296

[45] May 27, 1975

[54] CANNING PROCESS
[75] Inventors: Edward M. Brooks; Chaz W. Houpt, both of Van Nuys, Calif.
[73] Assignee: Carnation Company, Los Angeles, Calif.
[22] Filed: Mar. 22, 1973
[21] Appl. No.: 343,930

[52] U.S. Cl. ............... 426/325; 426/399; 426/401; 426/407; 426/131
[51] Int. Cl. .............................................. A23l 3/00
[58] Field of Search ........... 426/324, 325, 326, 335, 426/399, 401, 407, 408, 131, 321

[56] References Cited
UNITED STATES PATENTS

| | | | |
|---|---|---|---|
| 2,291,704 | 8/1942 | Fisher | 426/325 |
| 2,381,019 | 8/1945 | Webb | 426/325 |
| 2,434,388 | 1/1948 | Brehm | 426/106 |
| 2,702,247 | 2/1955 | Northcutt | 426/399 |

*Primary Examiner*—Raymond N. Jones
*Assistant Examiner*—Ernest G. Therkorn
*Attorney, Agent, or Firm*—Eugene C. Ziehm; Robert D. Kummel

[57] ABSTRACT

A process of canning particulate, normally low or medium acid foods and combinations of particulate, normally low or medium acid foods under conditions which provide a sterile product but which do not significantly adversely affect the taste, texture, appearance or nutritional value of the food. The low or medium acid food particles are acid blanched prior to being introduced into containers, to reduce the pH of the food. The acid blanched food is immersed in the containers in an acidic liquid phase which inhibits the growth of bacteria. The containers are subjected to a relatively low temperature, short-hold heat treatment to render the food sterile without significantly adversely affecting the taste, texture, appearance or nutritional value of the food.

12 Claims, No Drawings

CANNING PROCESS

BACKGROUND OF THE INVENTION

This invention relates to an improved process for the production and preservation of certain types of foods and combinations of foods in hermetically sealed containers, commonly referred to as canning. More particularly, the invention relates to a process of canning normally low or medium acid foods under conditions which provide a sterile product but which do not significantly alter the crispness and similar textural properties of the food. Moreover, there is no significant adverse effect on the nutritional value of foods processed according to the present invention.

Canned foods which are commercially available, generally are heat processed to prevent microbiological spoilage so that the product, at room temperature, will remain unspoiled indefinitely from a microbiological standpoint. Such canned foods are heat processed to render the product "commercially sterile," which term is defined to mean that degree of sterility at which all pathogenic and toxin-forming organisms have been destroyed, as well as other more resistant types which, if present, could grow in the product and produce spoilage under normal storage conditions.

It is well known that commercial sterility of canned foods is affected not only by heat treatment but also by the pH of the product. Thus it is well recognized that foods with a pH of less than 4.5 may be heat processed under relatively mild conditions to provide a sterile canned product. Foods such as tomatoes, pears, figs, pineapple and peaches, which have a pH of between 4.5 and 3.7, are referred to as acid foods. Foods such as berries, apples, citrus fruits, sauerkruat, and pickles, which have a pH of 3.7 and lower, are generally referred to as high acid foods. In practically all cases, acid-tolerant organisms can be destroyed by subjecting acid or high acid foods to a short heat process at about 212°F.

However, the growth of some microorganisms, such as *Clostridium botulinum*, is inhibited only in foods having a pH of 4.5 or less and are a potential health hazard in foods having a pH of above 4.5. Such foods include meats, seafood, milk, corn, lima beans, potatoes, spaghetti, spinach and olives which have a pH of 5.3 and higher (generally referred to as low acid foods), and foods such as asparagus, carrots, green beans, cabbage, bananas and pumpkin which have a pH of between 5.3 and 4.5 (generally referred to as medium acid foods). Such low acid and medium acid foods require high processing temperatures, that is, about 240°F, for prolonged periods of time in order to assure adequte destruction of the spores of food spoilage organisms. Thus, Bulletins 26-L (10th Edition, 1966) and 30-L (4th Edition, 1971) of the National Canners Association specify process times for many canned foods at several retort temperatures and for several container sizes. For example, the following process times are specified for 307 × 409 cans having an initial temperature of about 70°F at retort temperatures of 240°F; green beans, 21 minutes; carrots, 35 minutes; peas, 36 minutes; potatoes, 35 minutes. As a result of such extended high-temperature heat treatment, the color, texture, and flavor of the products are adversely affected. Consequently, most conventional, canned, low and medium acid foods are inferior in color, texture, and taste to fresh-cooked products. Moreover, such extended high temperature heat processing has been found to have an adverse affect on the nutritional value of foods.

It is believed that such undesirable changes in low and medium acid foods upon extended heat processing at high temperatures are due to several factors. Thus, retorting gelatinizes the starch contained in foods and causes partial breakdown of the microstructures of the starch masses and even some hydrolysis of the molecules. As a result, foods containing substantial amounts of starch, such as peas, beans, and potatoes, lose part of their structural identity and become undesirably soft and mushy. Also, the selective permeability of the cell membranes is destroyed by prolonged high temperature processing so that crispness and similar textural properties of the food no longer exist. Moreover, such extended high-temperature heat processing causes the partial decomposition of labile compounds, such as vitamins, flavor components, colors, and the like.

A number of alternative techniques have been suggested heretofore in an attempt to produce sterile low acid and medium acid foods in containers. However, such prior techniques are subject to a number of disadvantages which have limited their use in commercial operations. For example, it has been suggested that foods be sterilized prior to being placed in containers by passing the food through a high-temperature heat exchanger where the food is subjected to very high temperatures for a short period of time and is then aseptically filled into containers. However, the problems encountered in manipulating and filling some types of foods (such as, for example, asparagus), and the inability to pump other types of food products through heat exchangers due to their physical consistency, are reasons why most canned foods are still sterilized in the container after packaging.

SUMMARY OF THE INVENTION

The present invention provides a process of producing sterile canned foods which are not subject to the disadvantages discussed above. As used herein, the terms "sterile" and "sterilized" mean "commercially" sterile as that term is defined hereinabove. The process of this invention is applicable to the canning of single or mixed food products wherein animal or plant materials are intimately combined with a liquid phase, such as sauces, gravies, dressing, etc. The invention is concerned with the canning of normally low acid or medium acid foods, that is, foods which in their natural state have a pH of above 4.5, for it enables such foods to be canned under conditions which do not significantly adversely affect the texture, taste, appearance, or nutritional value of the food. Consequently, the product produced by the present process is sterile but is significantly superior in texture, taste, appearance, and nutritional value to products prepared by prior art techniques.

According to the present invention, a normally low acid or medium acid food, such as meat, spaghetti, or a vegetable having a pH of above 4.5 in its natural state, is subjected to an acid blanch at a relatively high temperature for a short period of time to reduce the overall pH of the food to below about 5.0. As used herein, the overall pH of the food refers to the pH obtained by measuring the pH of the food in comminuted form. The acid blanched food is then combined with an acidic liquid phase such as a sauce, gravy, dressing, etc., having a pH of below 4.5, in a suitable container, so that the liquid phase completely surrounds the food particles. The containers are sealed and heat sterilized, and the sterile containers are cooled. Due to the acid blanching of the food and the fact that they are submerged in the acidic liquid phase, the food particles in the container have an overall pH of 4.5 or below within about 30 minutes after the food particles and the liquid phase are combined. Therefore, the containers may be heat processed at a relatively low temperature for short periods of time and still provide a sterile product. As a result of heat sterilizing the containers at relatively low temperatures for short periods of time, the taste, texture, appearance, and nutritional value of normally low acid or medium acid foods are preserved.

DESCRIPTION OF PREFERRED EMBODIMENTS

Normally low acid and medium acid foods which are to be canned according to the present invention are subjected to a hot acid blanch for a relatively short period of time in order to reduce the overall pH of the food to about 5.0 or below. When such hot acid blanched foods are combined with an acidic liquid phase in containers so that the liquid phase surrounds the food, the product may be subjected to a minimum of heat processing, utilizing temperatures of about 212°F and below to provide a sterile product. The reduction in the overall pH of the normally low and medium acid foods to 5.0 or below is effected by contacting the normally low acid or medium acid food in particulate form, with an acidic aqueous medium at a relatively high temperature for a short period of time. This blanching can be accomplished by any suitable technique which provides adequate contact between the food particle and the hot acidic medium so that the time required to reduce the overall pH of the food particles to 5.0 or below is minimized. Suitable procedures include, for example, submerging the food pieces in a hot acid solution, drenching the food pieces with a hot acid solution, and other suitable techniques.

Since the reduction in overall pH of the normally low and medium acid food particles to about 5.0 or below is a function of time, temperature, pH, and particle size of the food, it is difficult to ascribe an exact range of conditions under which this blanching procedure can be practiced. In general, the temperature of the hot acid aolution is in the range of about 160°F to 212°F, preferably between about 180°F and 212°F, the pH of the acid solution is preferably between about 2.5 and 3.5, and the time of contact between the food particles and the hot acid solution is on the order of about 1 to 15 minutes. The food particles preferably have a thickness of no more than about one-half inch. Obviously, piece size and shape, the amount of agitation or rapidity of circulation of the hot acid solution and other factors will affect the rapidity of reduction in pH of the food. The important process limitation is that the overall pH of the normally low acid or medium acid food is rapidly reduced to about 5.0 or below without significantly adversely affecting the flavor and textural characteristics of the food.

Any acid, either organic or inorganic, which is suitable for use in conjunction with foods, may be used in the blanching solution. Suitable acids include, for example, acetic acid, citric acid, hydrochloric acid, lactic acid, malic acid, phosphoric acid, and tartaric acid. Generally, it is preferred to use malic acid in the blanching solution. It has been found that a malic acid solution is particularly suitable in reducing the overall pH of normally low or medium acid food particles to 5.0 or below in a short period of time without adversely affecting the taste, texture, appearance or nutrition of the food particles.

The amount of hot acidic blanching solution contacted with the food particles may vary widely. For example, ratios of 2.5 to 10 parts or more by weight of blanching solution per one part by weight of food particles have been found to be effective in rapidly reducing the overall pH of normally low and medium acid foods to 5.0 or below. It will be understood that ratios outside this range may be used as long as there is sufficient contact between the food particles and the blanching solution to effect rapid reduction in the overall pH of the food.

Contacting the food particles with the hot acid blanching solution in the manner described above not only effects the reduction in pH of the food, but also serves to substantially inactivate some enzymes in the foods to thereby prevent enzymatic reactions which could lead to changes in color, flavor or texture during subsequent holding or processing steps. Moreover, contacting the food particles with the hot blanching solution also serves to heat the food rapidly for subsequent processing.

The acid blanched food particles having an overall pH of 5.0 or below are quickly combined in a suitable container with an acidic liquid phase having a pH of below about 4.5 so that the acidic liquid phase surrounds the food particles in the container. The period of time between the completion of the blanching step and the combination of the blanched particles with the liquid phase is minimized and preferably should be accomplished as quickly as possible.

The order in which the food particles and the liquid phase are introduced into containers is of no particular significance as long as once in the container the liquid phase surrounds the food particles. Thus, the food particles and liquid phase may be either combined and then filled into the container, or they may be separately filled into the container. The containers are, of course, sealed after the introduction of the food particles and liquid phase thereinto. Generally, the liquid phase is at an elevated temperature, that is, on the order of about 100°F – 212°F, preferably between about 170°F – 200°F, when it is combined with the food particles which are also at an elevated temperature of between about 100°F – 212°F, preferably between 170°F and 200°F.

The nature of the acidic liquid phase will, of course, depend upon the type of product desired and the condiments included therein. Thus, the acidic liquid phase may be in the form of a sauce, gravy, dressing, and the like. The pH of the liquid phase is sufficient to not only inhibit the growth of microorganisms in the liquid phase but to also reduce the overall pH of the food particles to 4.5 or below within a relatively short period of time, so that the growth of microorganisms is also inhibited in the food particles. The important characteristics of the liquid phase are that it have a pH of 4.5 or below, preferably between about 2.5 and 4.0, have a taste which is compatible with an acid pH, and be a flowable liquid so that it surrounds the food particles in the container. The desired degree of acidity may be provided in the liquid phase by the inclusion therein of any suitable acids which are generally used in food processing, including natural acids such as tartaric acid and acid fruit juices; fermentation acids such as vinegar, lactic acid, citric acid, and fumaric acid; and synthetic acids, both organic and inorganic, such as malic acid, phosphoric acid, adipic acid, and the like.

The containers holding the food particles immersed in the acidic liquid phase are then sealed and subjected to heat processing sufficient to destroy acid-tolerant microorganisms. The food particles in the container have an overall pH of 4.5 or below usually within about 30 minutes after the food particles and liquid phase are combined and the container sealed. The particular time and temperature relationship required to destroy acid-tolerant microorganisms will, of course, depend upon the pH of the food particles and the liquid phase and can readily be determined by those skilled in the heat sterilization art. A temperature of about 140°F to 200°F throughout all particles of the food is usually considered sufficient to cause the destruction of acid-tolerant organisms. Thus, a commercially sterile product can be provided by subjecting the sealed containers to a short heat process, that is, on the order of about 10 to 15 minutes at or below 212°F, when the overall pH of the food particles is 4.5 or below at the time of sterilization. Due to the fact that the product is heat sterilized under relatively mild conditions, the normally low acid food substantially retains its flavor and textural characteristics. Moreover, since the maximum temperature to which the product is subjected is 212°F, containers of minimum strength may be used for holding the product, thereby allowing greater manufacturing flexibility, utilizing a variety of packaging materials. Upon completion of heat sterilization, the containers are quenched so that the internal temperature of the containers quenched is below about 125°F, preferably to about 100°F – 120°F, in order to preserve the texture of the food particles.

The following examples are given in order to illustrate but not to limit the present invention:

EXAMPLE I

Vegetables in Salad Dressing

A salad comprising vegetables in French dressing is prepared in the following manner:

Liquid Phase - French Dressing

| Ingredients | Percent |
|---|---|
| Water | 47.50 |
| Cottonseed Oil | 22.00 |
| Catsup | 10.00 |
| Vinegar (100 grain) | 9.00 |
| Sugar | 6.44 |
| Salt | 2.67 |
| Paprika | 1.00 |
| Onion Powder | 0.60 |
| Xanthan Gum | 0.40 |
| Dry Mustard | 0.20 |
| Garlic Powder | 0.10 |
| White Pepper | 0.09 |
| | 100.00 |

The salad dressing is prepared by mixing the ingredients and homogenizing the mixture at about 1,500 psig. The salad dressing thus formed has a pH of about 3.1 and is heated, with agitation, to about 200°F.

Particulate Food Phase

Fresh celery (pH of about 5.6 – 6.2), fresh onion (pH of about 5.2 – 5.6), kidney beans (pH of 5.5 – 6.4), and fresh carrots (pH of about 5.6 – 6.5) are used as the normally low acid and medium acid foods. The celery is cut into ⅜ inch slices, the onion cut in slices about 3/16 inch, and the carrots are cut into sliced about ¼ inch thick. The vegetables are then subjected to a hot acid blanch by mixing the vegetables with a malic acid solution having a pH of 2.85 and a temperature of 190°F in a continuous steam blancher/cooker. In the blanching of each vegetable, 5 pounds of the vegetables are contacted with 50 pounds of the blanching solution.

The blanching time for the vegetables and the overall pH of the vegetables after blanching are set out in Table 1:

TABLE I

| Vegetable | Blanching Time (Minutes) | pH of Vegetables Immediately After Blanching | pH of Vegetables After 30 Minutes Packed in Dressing |
|---|---|---|---|
| Onion | 2 | 4.87 | 4.20 |
| Celery | 2 | 5.00 | 3.98 |
| Kidney beans | 5 | 4.98 | 4.25 |
| Carrots | 3 | 5.00 | 3.85 |

After the blanching step, the vegetables, having a temperature of about 180°F are filled into cans. The liquid salad dressing, having a temperature of about 200°F, is then added to the cans in an amount sufficient to completely cover the vegetables, the cans containing about 65% by weight of vegetables and 35% by weight of salad dressing. The cans are then sealed, inverted, and heat processed at 210°F for 10 minutes. The cans are then quickly quenched with cool water for about 30 minutes to reduce the internal temperature of the cans to about 120°F. The resulting product is commercially sterile. The vegetables in the product substantially retain the taste, texture, appearance and nutrition of fresh vegetables.

In order to show the effect of the acidic liquid phase (salad dressing) on the normally low or medium acid foods (vegetable particles), a number of the filled cans were examined about 30 minutes after the acid blanched vegetable particles were combined with the salad dressing. These cans were heat processed, using the same conditions as those above. The overall pH of the vegetable after this 30 minute period was determined by comminuting the vegetables with distilled water in a blender and measuring the pH of each comminuted vegetable. The results of this test are also set out in Table 1, above.

The product prepared above, when used in conjunction with fresh lettuce, provides the vegetables and dressing for a complete garden salad. Similar results are obtained when other acids used in food processing, such as, for example, citric, phosphoric, hydrochloric, tartaric, and the like, are used in the blanching solution.

EXAMPLE II

As noted hereinabove, the process of the present invention does not significantly adversely affect the nutritional value of the food particles. This is clearly shown in the following comparative test in which an analysis was made of the vitamin and mineral content of vegetables in French dressing and the same vegetables in French dressing processed according to the present invention. The French dressing was prepared using the same formula and procedure set out in Example I.

In the "fresh" sample, fresh tomatoes, celery, onions, carrots and canned olives were combined with the French dressing in the amount of 35% by weight of dressing and 65% by weight of vegetables. The vegetables in this fresh sample were not acid blanched nor was the combined product subject to heat processing.

A "processed" sample was then prepared according to the process of the present invention. The same French dressing was used in this Processed sample as in the fresh sample. The vegetables, except the tomatoes, were acid blanched by contacting the sliced vegetables with a malic acid solution having a pH of 2.85 and a temperature of 190°F. The celery was blanched for 2 minutes, the onions for 2 minutes, the carrots for 3 minutes, and the olives for 8 minutes. The acid blanched vegetables and tomatoes were then combined with the salad dressing and heat processed according to the procedure set out in Example I.

The fresh sample and the processed sample were then comminuted in a blender and analyzed for vitamin and mineral content using the same standard analytical procedure. The results of this test are set out on Table 2:

TABLE 2

|  | Fresh Sample | Processed Sample |
| --- | --- | --- |
| Vitamin A | 223.0 IU/100g. | 326.2 IU/100g. |
| Vitamin $B_1$ | 0.061 mg/100g. | 0.057 mg/100g. |
| Vitamin $B_2$ | 0.066 mg/100g. | 0.062 mg/100g. |
| Vitamin C | 3.26 mg/100g. | 4.70 mg/100g. |
| Niacin | 0.50 mg/100g. | 0.47 mg/100g. |
| Calcium | 20.62 mg/100g. | 22.92 mg/100g. |
| Iron | 0.39 mg/100g. | 0.54 mg/100g. |
| Potassium | 233.58 mg/100g. | 217.59 mg/100g. |
| Magnesium | 10.77 mg/100g. | 11.53 mg/100g. |
| Phosphorous | 25.70 mg/100g. | 26.31 mg/100g. |

The differences between the values for the fresh and processed samples are minor and are believed to be due to differences which may exist in individual vegetables and to differences in the total dry solids of the samples tested. It is significant to note that the vitamin and mineral content of the product processed according to the present invention were not significantly lower than the fresh sample. In contrast, subjecting foods to prior art extended high temperature processing significantly reduces the nutritional value of the food.

EXAMPLE III

Spaghetti in Sauce

Spaghetti in sauce is prepared as follows:
Liquid Phase - Sauce

The sauce is prepared using as ingredients tomato puree (12.4% solids), diced tomatoes, sugar, dehydrated cheese, salt, spices, food grade starch, vegetable oil, acid (citric and malic), calcium chloride and water, by mixing the ingredients. The sauce, which has a pH of 4.2, is heated to about 200°F - 205°F.

Particulate Food Phase - Pasta

Pasta, having a pH of about 5.5 - 6.0, is acid blanched by immersing the pasta for about 10 minutes in a malic acid solution having a temperature of 212°F and a pH of 3.5. The acid blanched pasta has a pH of below 4.5.

The acid blanched pasta, at a temperature of about 200°F is filled into cans. The sauce, having a temperature of about 200°F is then added to the cans in an amount sufficient to cover the pasta. The cans are then sealed, inverted, and heat processed for 15 minutes at 212°F. The cans are then quenched with cool water to reduce the temperature of the cans to below about 120°F. The resulting product is commercially sterile. This process has produced canned pasta of excellent texture, quality, flavor, and appearance, which have been maintained over storage.

If desired, meat in the form of meatballs may be included in the above product. One technique for providing such a meat-containing product is to form individual meatballs about ⅜ inch to ½ inch in diameter from a suitable mix and sterilize the meatballs, such as by steam cooking at 250°F for 15 minutes. The sterile meatballs are then added to the heated sauce, as prepared above, and this mixture combined with the acid blanched pasta so that the pasta and meatballs are surrounded by the acidic sauce. The total combination is heated at 205°F for 10 minutes, filled into cans, and the cans are then sealed, inverted, heat processed at 212°F for 15 minutes and cooled. A spaghetti and meatball product prepared in this manner was compared against commercially available canned and/or frozen spaghetti and meatball products by a flavor panel and was statistically significantly preferred at p=.05.

It will, of course, be understood that meat and meat-containing particles having a thickness of no more than about one-half inch may be incorporated in the product without such initial sterilization of the meat or meat-containing particles. Thus, such food particles may be acid blanched, in accordance with the present invention, to reduce the pH of such particles to at least about 5.0 and then combined with the acidic liquid phase.

As stated hereinabove, it has been demonstrated that normally low acid foods when subjected to a hot acid blanch in accordance with the present invention to reduce the overall pH of the food to 5.0 or below and combined with an acidic liquid phase can be canned and sterilized without substantial loss of their taste, texture, or appearance, even after prolonged periods of storage and with no significant adverse effect on their nutritional value.

Although the present invention has been described and illustrated with reference to specific examples, it will be understood that changes, modifications, and variations of composition and procedure may be made by those skilled in the art within the principle and scope of the invention as set forth in the appealed claims.

What is claimed is the following:

1. A process for canning normally low acid or medium acid foods to provide a sterile product in which the taste, texture, appearance and nutritional value of the foods are substantially retained, which comprises blanching normally low acid or medium acid food particles with a hot acidic solution having a temperature and pH sufficient to reduce the overall pH of the food to at least about 5.0, the hot acidic solution being maintained in contact with the food particles for between about 1 to 15 minutes, contacting said acid blanched food particles with an acidic condiment-containing liquid phase having a pH of below 4.5 in a container so that the acidic condiment-containing liquid phase surrounds the food particles in the container, and reduces the overall pH of said food particles to at least 4.5, sealing the container, heat processing the sealed container at a maximum temperature of 212° F. for a maximum period of time of 15 minutes to destroy acid-tolerant microorganisms whereby the contents of the container are rendered sterile without substantial change in the taste, texture, appearance and nutritional value of the food, and cooling the container.

2. The process defined in claim 1 in which the hot acidic solution has a pH of between about 2.5 and 3.5 and a temperature of about 160°F to 212°F and is maintained in contact with the food particles for between about 1 to 15 minutes.

3. The process defined in claim 1 in which the amount of hot acidic solution contacted with the food particles is in the range of about 2.5 to 10 parts by weight of acid solution per part by weight of said food.

4. The process defined in claim 1 in which both the acid blanched food and the acidic condiment-containing liquid phase are at a temperature of between about 100°F – 212°F when they are combined.

5. The process defined in claim 1 in which the food particles have a thickness of no more than about one-half inch.

6. The process defined in claim 1 in which the sealed container is heat processed for 10 to 15 minutes at a temperature of about 212°F.

7. The process defined in claim 1 in which the container is cooled so that the internal temperature of the container is below about 125°F.

8. The process defined in claim 1 in which the acid blanched food particles and the acidic condiment-containing liquid phase are combined prior to being filled into a container.

9. The process defined in claim 1 in which the acid blanched food particles and the acidic condiment-containing liquid phase are separately filled into a container.

10. The process defined in claim 1 in which a sterile food having a pH of above 4.5 is combined with the acid blanched food particles and the acidic condiment-containing liquid phase.

11. The process defined in claim 10 in which the sterile food is selected from the group consisting of meat and meat-containing foods.

12. The process defined in claim 1 in which the food particles are vegetables having a pH of above 4.5 and a thickness of no more than one-half inch, said vegetables being contacted with an acidic solution having a temperature of 180°F – 210°F, a pH of between 2.5 – 3.5 for between 1 to 15 minutes to reduce the overall pH of said vegetables to no higher than about 5.0, said vegetables while at a temperature of between about 170°F – 200°F being combined in a container with an acidic condiment-containing liquid phase having a pH of between about 2.5 – 4.0 and a temperature of about 170°F – 200°F, and the container is heated at a temperature of about 212°F for 10 – 15 minutes.

* * * * *